(12) United States Patent
Sippel et al.

(10) Patent No.: US 11,053,806 B2
(45) Date of Patent: Jul. 6, 2021

(54) BRAZED BLADE TRACK FOR A GAS TURBINE ENGINE

(71) Applicants: Rolls-Royce Corporation, Indianapolis, IN (US); Rolls-Royce North American Technologies, Inc., Indianapolis, IN (US); Rolls-Royce plc, London (GB)

(72) Inventors: Aaron D. Sippel, Zionsville, IN (US); Daniel K. Vetters, Indianapolis, IN (US); Jun Shi, Carmel, IN (US); David J. Thomas, Brownsburg, IN (US); Andrew J. Eifert, Indianapolis, IN (US); Peter Broadhead, Derby (GB)

(73) Assignees: Rolls-Royce Corporation, Indianapolis, IN (US); Rolls-Royce North American Technologies Inc., Indianapolis, IN (US); Rolls-Royce plc

( * ) Notice: Subject to any disclaimer, the term of this patent is extended or adjusted under 35 U.S.C. 154(b) by 3 days.

(21) Appl. No.: 16/661,572

(22) Filed: Oct. 23, 2019

(65) Prior Publication Data

US 2020/0056493 A1 Feb. 20, 2020

Related U.S. Application Data

(63) Continuation of application No. 15/094,502, filed on Apr. 8, 2016, now Pat. No. 10,494,935.

(Continued)

(51) Int. Cl.
*F01D 9/04* (2006.01)
*F01D 9/02* (2006.01)
*F01D 25/24* (2006.01)

(52) U.S. Cl.
CPC .............. *F01D 9/02* (2013.01); *F01D 9/04* (2013.01); *F01D 25/246* (2013.01);
(Continued)

(58) Field of Classification Search
CPC ........ F01D 11/08; F01D 11/003; F01D 11/12; F01D 11/18; F01D 25/246; F01D 25/005;
(Continued)

(56) References Cited

U.S. PATENT DOCUMENTS 3,601,414 A 8/1971 Rao
4,087,199 A 5/1978 Hemsworth et al.
(Continued)

FOREIGN PATENT DOCUMENTS

DE 10200804450 A1 2/2009
EP 1965030 A2 9/2008
(Continued)

OTHER PUBLICATIONS

Gregory S. Gorman et al., DOE-CE-41000-3, Melt Infiltrated Ceramic Composites (Hipercomp®) For Gas Turbine Engine Applications, Jan. 2006, 507 pages.

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A blade track for a gas turbine engine includes segments and joints that couple the segments together. Each segment extends part-way around a central axis of the engine and the joints couple together adjacent segments to form a full hoop.

17 Claims, 7 Drawing Sheets

Related U.S. Application Data

(60) Provisional application No. 62/154,440, filed on Apr. 29, 2015.

(52) U.S. Cl.
CPC .... *F05D 2220/32* (2013.01); *F05D 2230/237* (2013.01); *F05D 2230/60* (2013.01); *F05D 2240/307* (2013.01); *F05D 2300/20* (2013.01); *F05D 2300/6033* (2013.01); *Y02T 50/60* (2013.01)

(58) Field of Classification Search
CPC ........ F01D 9/02; F01D 9/04; F05D 2230/237; F05D 2300/6033; F05D 2400/307; F05D 2240/11; B23K 1/00; B23K 1/0018
See application file for complete search history.

(56) References Cited

U.S. PATENT DOCUMENTS

| | | | |
|---|---|---|---|
| 4,365,933 A | 12/1982 | Langer et al. |
| 4,477,086 A | 10/1984 | Feder et al. |
| 4,533,149 A | 8/1985 | Vater et al. |
| 4,646,810 A | 3/1987 | Lardellier |
| 4,679,981 A | 7/1987 | Guibert et al. |
| 4,844,487 A | 7/1989 | Eakin |
| 4,863,345 A | 9/1989 | Thompson et al. |
| 5,163,809 A | 11/1992 | Akgun et al. |
| 5,310,434 A | 5/1994 | Vives et al. |
| 5,437,538 A | 8/1995 | Mitchell |
| 5,738,490 A | 4/1998 | Pizzi |
| 6,142,731 A | 11/2000 | Dewis et al. |
| 6,315,519 B1 | 11/2001 | Bagepalli et al. |
| 6,517,313 B2 | 2/2003 | Rogers |
| 6,726,448 B2 | 4/2004 | McGrath et al. |
| 6,733,233 B2 | 5/2004 | Jasklowski et al. |
| 6,758,386 B2 | 7/2004 | Marshall et al. |
| 6,758,653 B2 | 7/2004 | Morrison |
| 6,863,759 B2 | 3/2005 | Richmond et al. |
| 6,896,483 B2 | 5/2005 | Dierksmeier et al. |
| 6,910,853 B2 | 6/2005 | Corman et al. |
| 7,090,459 B2 | 8/2006 | Bhate et al. |
| 7,195,452 B2 | 3/2007 | Allan et al. |
| 7,217,089 B2 | 5/2007 | Durocher et al. |
| 7,234,306 B2 | 6/2007 | Aumont et al. |
| 7,374,396 B2 | 5/2008 | Martin et al. |
| 7,435,049 B2 | 10/2008 | Ghasripoor et al. |
| 7,641,442 B2 | 1/2010 | Denece et al. |
| 7,665,960 B2 | 2/2010 | Shi et al. |
| 7,771,160 B2 | 8/2010 | Shi et al. |
| 7,914,256 B2 | 3/2011 | Xie et al. |
| 7,988,395 B2 | 8/2011 | Steffier |
| 8,047,773 B2 | 11/2011 | Bruce et al. |
| 8,061,977 B2 | 11/2011 | Keller et al. |
| 8,079,807 B2 | 12/2011 | Shapiro et al. |
| 8,092,160 B2 | 1/2012 | Shi et al. |
| 8,167,546 B2 | 5/2012 | Shi et al. |
| 8,231,338 B2 | 7/2012 | Ballard, Jr. et al. |
| 8,235,670 B2 | 8/2012 | Morrison et al. |
| 8,257,029 B2 | 9/2012 | Habarou et al. |
| 8,322,983 B2 | 12/2012 | Marini |
| 8,328,505 B2 | 12/2012 | Shi et al. |
| 8,496,431 B2 | 7/2013 | Habarou et al. |
| 8,511,975 B2 | 8/2013 | Shi et al. |
| 8,555,647 B2 | 10/2013 | Dimascio et al. |
| 8,568,091 B2 | 10/2013 | McCaffrey |
| 8,651,497 B2 | 2/2014 | Tholen et al. |
| 8,684,689 B2 | 4/2014 | Guo et al. |
| 8,739,547 B2 | 6/2014 | Jarmon et al. |
| 8,740,552 B2 | 6/2014 | Marusko et al. |
| 8,753,073 B2 | 6/2014 | Albers et al. |
| 8,770,931 B2 | 7/2014 | Alvanos et al. |
| 8,784,052 B2 | 7/2014 | Shi et al. |
| 8,790,067 B2 | 7/2014 | McCaffrey et al. |
| 8,801,372 B2 | 8/2014 | Shi et al. |
| 8,814,173 B2 | 8/2014 | Motzkus et al. |
| 8,834,106 B2 | 9/2014 | Luczak |
| 8,926,270 B2 | 1/2015 | Karafillis et al. |
| 9,011,079 B2 | 4/2015 | Coign et al. |
| 2004/0047726 A1 | 3/2004 | Morrison |
| 2009/0110549 A1 | 4/2009 | Snook et al. |
| 2009/0208322 A1 | 8/2009 | McCaffrey |
| 2010/0111678 A1 | 5/2010 | Habarou et al. |
| 2010/0150703 A1 | 6/2010 | Gonzalez et al. |
| 2010/0232941 A1 | 9/2010 | Smoke et al. |
| 2011/0052384 A1 | 3/2011 | Shi et al. |
| 2011/0057394 A1 | 3/2011 | Halling |
| 2011/0150635 A1 | 6/2011 | Motzkus et al. |
| 2011/0274538 A1 | 11/2011 | Shi et al. |
| 2012/0070276 A1 | 3/2012 | Shi et al. |
| 2012/0107107 A1 | 5/2012 | Chan et al. |
| 2012/0156029 A1 | 6/2012 | Karafillis et al. |
| 2012/0177488 A1 | 7/2012 | Corman |
| 2012/0247124 A1 | 10/2012 | Shapiro et al. |
| 2012/0263582 A1 | 10/2012 | Foster et al. |
| 2012/0301269 A1 | 11/2012 | Alvanos et al. |
| 2012/0301303 A1 | 11/2012 | Alvanos et al. |
| 2012/0301312 A1 | 11/2012 | Berczik et al. |
| 2012/0308367 A1 | 12/2012 | Luczak |
| 2013/0008176 A1 | 1/2013 | Shi et al. |
| 2013/0011248 A1 | 1/2013 | Croteau et al. |
| 2013/0177384 A1 | 7/2013 | Coign et al. |
| 2013/0177411 A1 | 7/2013 | Weber et al. |
| 2013/0266435 A1 | 10/2013 | Foster et al. |
| 2014/0023490 A1 | 1/2014 | Hillier |
| 2014/0030076 A1 | 1/2014 | Nunez et al. |
| 2014/0161596 A1* | 6/2014 | Kulkarni ............... F01D 11/08 415/173.1 |
| 2014/0202168 A1 | 7/2014 | Shapiro et al. |
| 2014/0260320 A1 | 9/2014 | Graves et al. |
| 2014/0271144 A1 | 9/2014 | Landwehr et al. |
| 2015/0044044 A1 | 2/2015 | Sippel et al. |
| 2015/0375322 A1* | 12/2015 | Salm ..................... F01D 5/147 428/548 |

FOREIGN PATENT DOCUMENTS

| | | |
|---|---|---|
| EP | 2589774 A1 | 5/2013 |
| EP | 2604805 A2 | 6/2013 |
| EP | 2631434 A2 | 8/2013 |
| FR | 2580033 A1 | 10/1986 |
| FR | 2980235 B1 | 4/2015 |
| GB | 2235730 A | 3/1991 |
| GB | 2468768 A | 9/2010 |
| GB | 2480766 A | 11/2011 |
| GB | 2481481 A | 12/2011 |
| JP | 09250304 A | 9/1997 |
| JP | 09264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014149094 A1 | 9/2014 |
| WO | 2014163674 A1 | 10/2014 |
| WO | 2015023324 A2 | 2/2015 |

\* cited by examiner

BRAZED BLADE TRACK FOR A GAS TURBINE ENGINE

CROSS REFERENCE TO RELATED APPLICATIONS

This application is a continuation of U.S. Non-Provisional patent application Ser. No. 15/094,502, filed Apr. 8, 2016, which claims priority to and the benefit of U.S. Provisional Patent Application Ser. No. 62/154,440, filed 29 Apr. 2015, the disclosures of which are now expressly incorporated herein by reference.

FIELD OF THE DISCLOSURE

The present disclosure relates generally to gas turbine engines, and more specifically to blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gasses moving through a primary gas path of the engine. The rotating wheel assemblies include disks carrying blades around their outer edges. When the rotating wheel assemblies turn, tips of the blades move along blade tracks that are arranged around the rotating wheel assemblies. Such blade tracks are adapted to reduce the leakage of gas over the blades without interaction with the blades. The blade tracks may also be designed to minimize leakage of gas into or out of the primary gas path. Design and manufacture of such blade tracks from composite material, such as ceramic-matrix composites, can present challenges.

SUMMARY

The present disclosure may comprise one or more of the following features and combinations thereof.

According to one aspect of the present disclosure, a full-hoop blade track for a gas turbine engine includes a first segment, a second segment, and a joint that couples the first segment with the second segment. The first segment and second segment form a tongue and groove interface.

The first segment may comprise ceramic-matrix composite materials and may be shaped to extend part-way around a central axis. The first segment includes a first and a second circumferential end portion. The second segment may comprise ceramic-matrix composite materials and may be shaped to extend part-way around the central axis. The second segment includes a first and a second circumferential end portion. The joint may include a circumferentially-extending tongue formed by the second circumferential end portion of the first segment, a circumferentially-extending groove formed by the first circumferential end portion of the second segment and shaped to receive the circumferentially-extending tongue, and a layer of bonding material arranged at an interface formed circumferentially between the first segment and the second segment to fix the first segment to the second segment.

These and other features of the present disclosure will become more apparent from the following description of the illustrative embodiments.

DETAILED DESCRIPTION OF THE DRAWINGS

Figure 1:
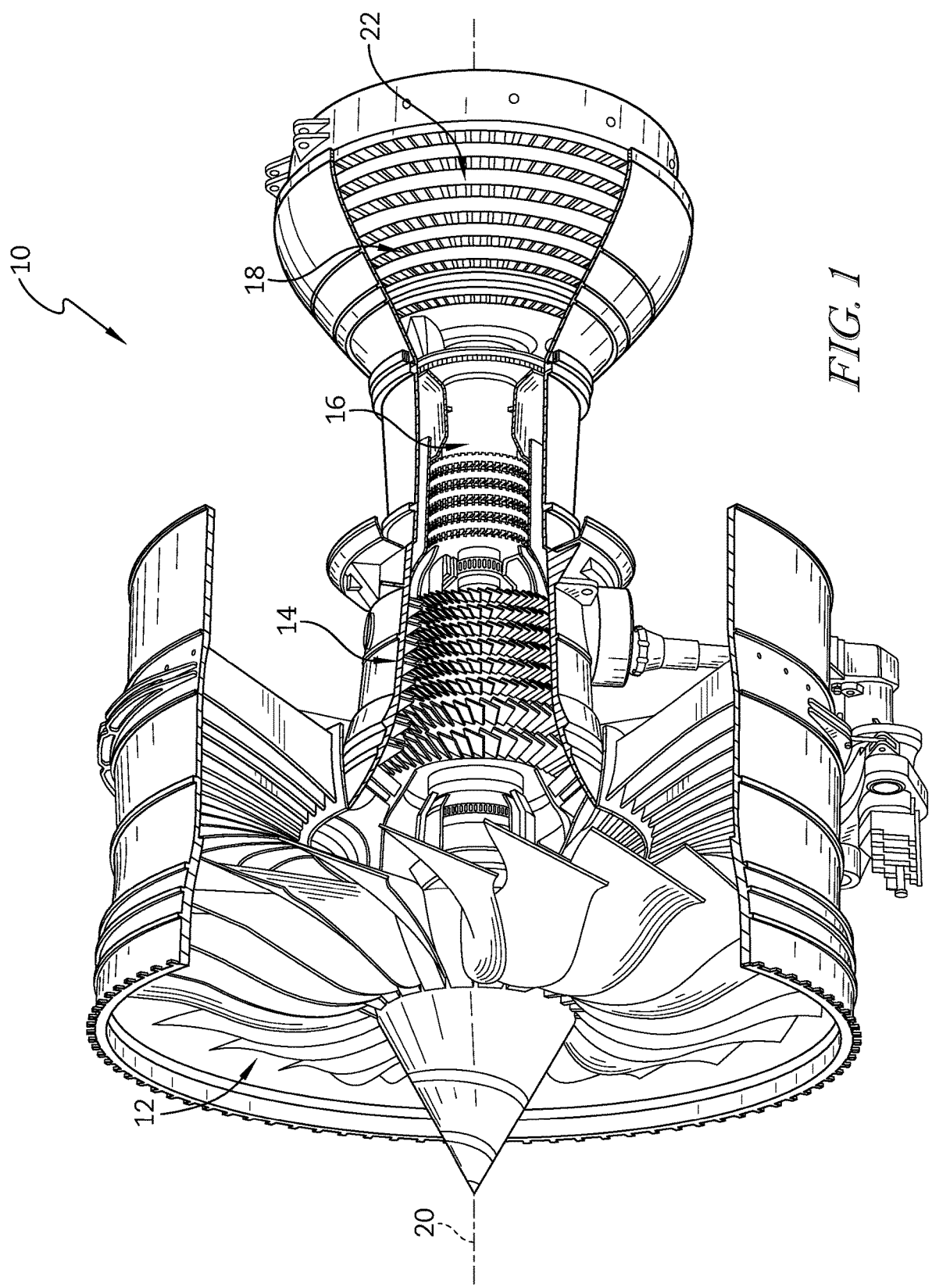
FIG. 1 is a perspective view of a gas turbine engine cut away to show that the engine includes a fan, a compressor, a combustor, and a turbine.

For the purposes of promoting an understanding of the principles of the disclosure, reference will now be made to a number of illustrative embodiments illustrated in the drawings and specific language will be used to describe the same.

FIG. 1 is an illustrative gas turbine engine 10 cut-away to show that the engine 10 includes a fan 12, a compressor 14, a combustor 16, and a turbine 18. The fan 12 is arranged to rotate about a central axis 20 of the engine 10 to provide thrust for an air vehicle. The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 and the turbine 18 extracts work to drive the compressor 14 and the fan 12. In other embodiments, the gas turbine engine 10 includes a driveshaft driven by the turbine 18 and the fan 12 is omitted.

Figure 2:
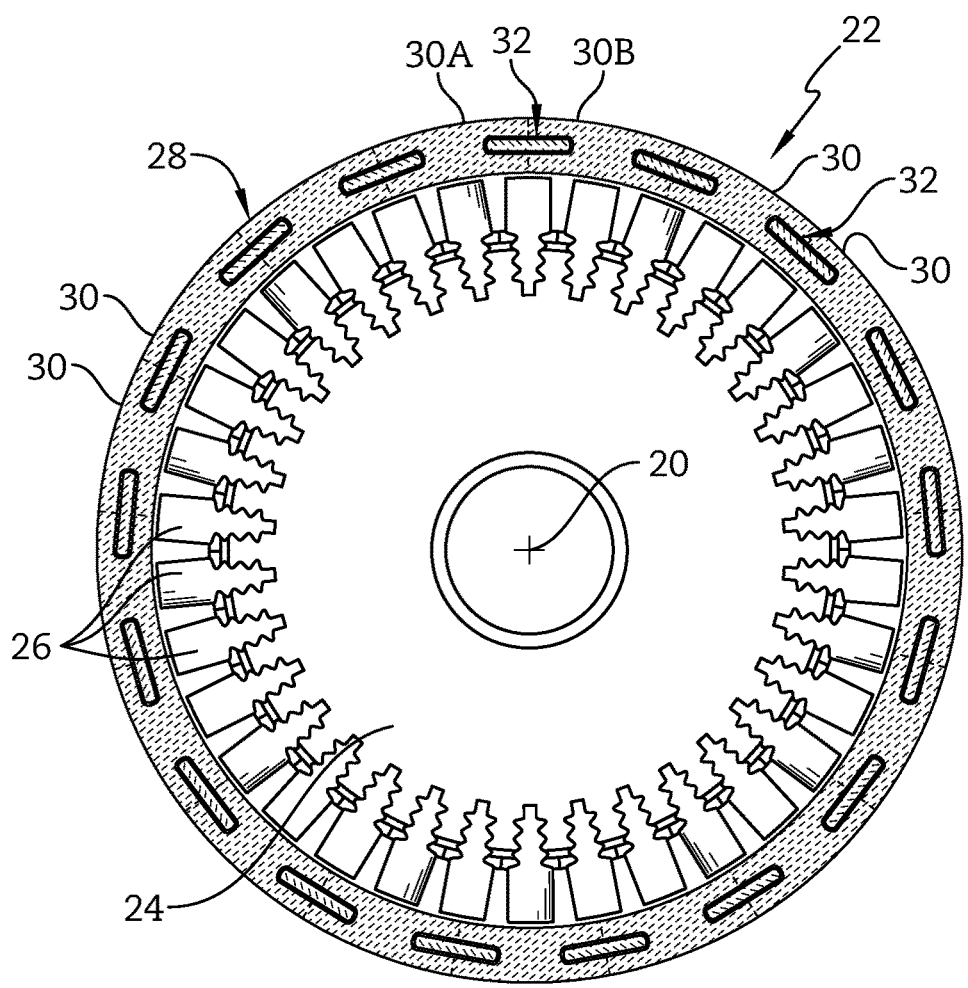
FIG. 2 is an axially-looking cross-sectional view of one turbine stage included in the turbine of the engine shown in FIG. 1 showing that the turbine stage includes a turbine wheel assembly and a blade track that extends around the turbine wheel.

The turbine 18 illustratively includes a plurality of turbine stages. A turbine stage includes a turbine wheel assembly 22 and a blade track 28 (sometimes called seal ring) as shown in FIGS. 1 and 2. The turbine wheel assembly 22 includes a turbine disk 24 and a plurality of blades 26 that extend out from the turbine disk 24. The blades 26 are pushed by the combustion products to cause the turbine wheel assembly 22 to rotate; thereby, driving rotating components of the compressor 14 and/or the fan 12. The blade track 28, shown in FIG. 2, extends around the turbine wheel assembly 22 and is configured to block most combustion products from passing over the blades 26 without pushing the blades 26 to rotate. In other embodiments, the blade track 28 may be used in the compressor 14.

Figure 3:
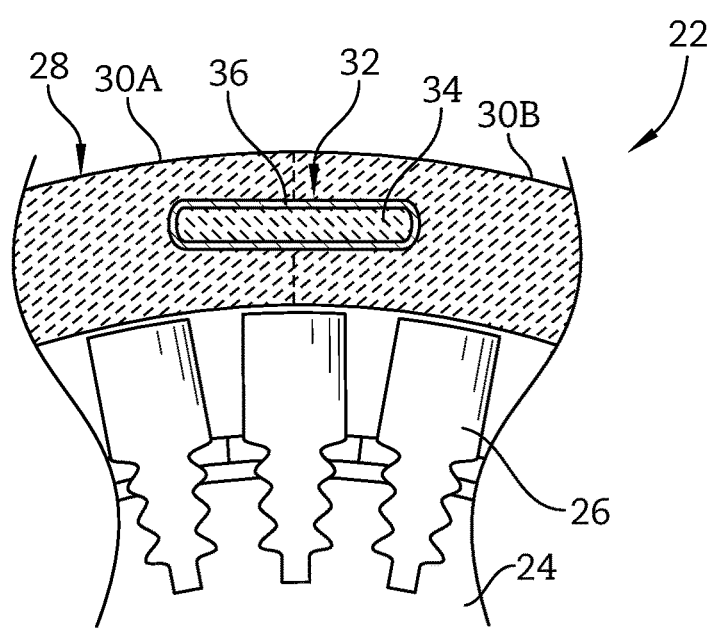
FIG. 3 is a detail view of a portion of FIG. 2 showing that the blade track includes track segments and joints that couple the first segment to the track segments together and showing that the joints include biscuits that extend into the track segments and are bonded to the track segments to fix the track segments in place.

The blade track 28 includes track segments 30 and joints 32 that integrally bond the track segments 30 into a full hoop as shown in FIG. 2. The segments 30 are located circumferentially adjacent to one another around the central axis 20. The joints 32 couple the track segments 30 together to fix the track segments 30 in place relative to one another as shown in FIGS. 2 and 3. The blade track 28 is illustratively made from ceramic-matrix composite materials, such as, for example silicon-carbide reinforcements suspended in silicon-carbide matrix as suggested in FIGS. 2 and 3. In other embodiments, the blade track 28 may be made from other ceramic-containing materials or from metallic materials.

Figure 4:
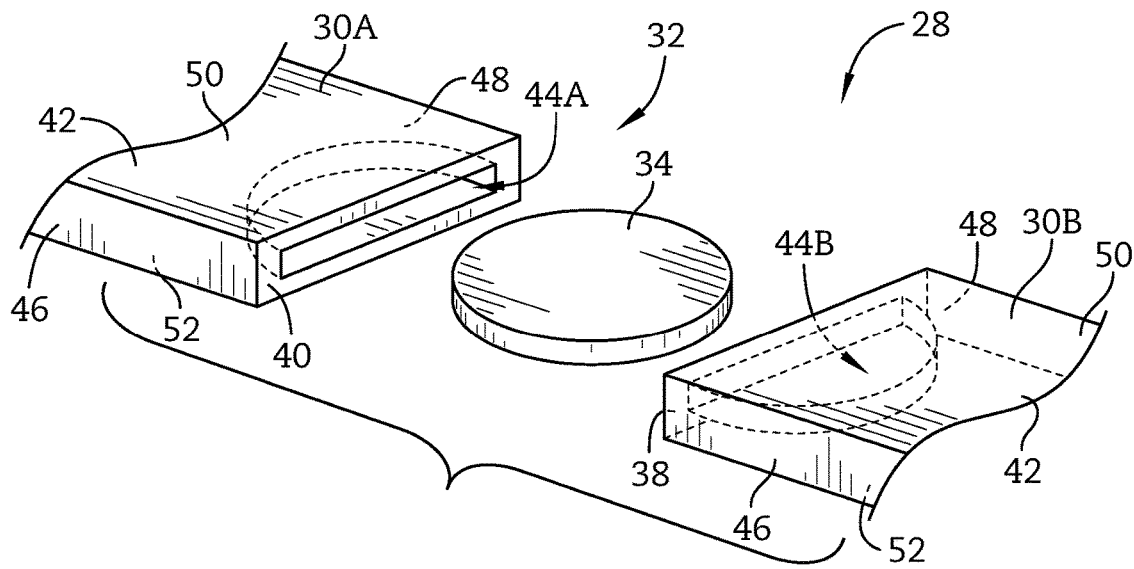
FIG. 4 is a partial exploded perspective view of the blade track of FIG. 2 showing that the biscuit has a round-disk shape and is sized to extend into slots formed in circumferential ends of the track segments.

Referring to FIG. 4, each track segment 30 has a first circumferential end face 38, a second circumferential end face 40, and a central section 42 interconnecting the first circumferential end face 38 and the second circumferential end face 40. Each first circumferential end face 38 is arranged to face the second circumferential end face 40 of the neighboring track segment 30. The joints 32 couple the track segments 30 together to fix each first circumferential end face 38 in place relative to the second circumferential end face 40 of the neighboring track segment 30. In the illustrative embodiment, the first and second circumferential end faces 38, 40 are generally planer and extend axially relative to the central axis 20.

Illustratively, each joint 32 includes a biscuit 34 (sometimes called a disk) as shown in FIGS. 3 and 4. Each biscuit 34 extends into neighboring track segments 30 as shown in FIGS. 2 and 3. As shown in FIG. 4, a biscuit 34 extends into a first track segment 30A along the second circumferential end face 40 of the first track segment 30A and into a neighboring second track segment 30B along the first circumferential end face 38 of the second track segment 30B. The biscuit 34 fixes the second track segment 30B in place relative to the first track segment 30A. Illustratively, each biscuit 34 comprises ceramic-containing materials. In the illustrative embodiment, each biscuit 34 comprises ceramic-matrix composite materials.

The second circumferential end face 40 of the first track segment 30A and the first circumferential end face 38 of the second track segment 30B face one another. As shown in FIG. 3, substantially all of the biscuit 34 is received in the first track segment 30A and the second track segment 30B. Illustratively, the second circumferential end face 40 of the first track segment 30A is engaged with the first circumferential end face 38 of the second track segment.

As shown in FIG. 4, the track segments 30 further include a forward axial face 46, an aft axial face 48, an outer radial face 50, and an inner radial face 52. The forward axial face 46 faces a forward end of the blade track 28. The aft axial face 48 is spaced apart axially from the forward axial face 46 and faces an aft end of the blade track 28. The outer radial face 50 faces radially outward away from the central axis 20 and interconnects the forward and aft axial faces 46, 48. The inner radial face 52 is spaced apart radially from the outer radial face 50 to locate the inner radial face 52 radially between the central axis 20 and the outer radial face 50. The inner radial face 52 interconnects the forward and aft axial faces 46, 48.

In the illustrative embodiment, the end faces 38, 40 of the track segments 30 are formed to include blind slots 44 as shown in FIG. 4. Each track segment 30 is formed to include a first blind slot 44A and a second blind slot 44B. The first blind slot 44A extends into the track segments 30 from the second circumferential end face 40 toward the first circumferential end face 38. The second blind slot 44B extends into the track segments 30 from the first circumferential end face 38 toward the second circumferential end face 40.

Each blind slot 44 is spaced apart radially from the outer radial face 50 and the inner radial face 52 of the track segment 30 to locate the blind slot 44 therebetween as shown in FIG. 4. Each blind slot 44 is spaced apart axially from the forward axial face 46 and the aft axial face 48 of the track segment 30 to locate the blind slot 44 therebetween. In other embodiments, the blind slots 44 extend axially through one or both of the forward and aft axial faces 46, 48. In the illustrative embodiment, each blind slot 44 is shaped to match the contour of the corresponding biscuit 34.

As shown in FIG. 4, the biscuit 34 has a round-disk shape. In other embodiments, the biscuit 34 has one of an oblong-disk shape, a rectangular-disk shape, and a diamond-disk shape. As a result, each blind slot 44 may be shaped, for example, as one-half of a round-disk shape, an oblong-disk shape, a rectangular-disk shape, and a diamond-disk shape. In the illustrative embodiments, the blind slots 44 have shapes corresponding to about half of a received biscuit 34. In other embodiments, the blind slots 44 have other shapes.

Each joint 32 further includes a bonding material. Illustratively, the bonding material comprises braze material 36 as shown in FIG. 3. The braze material 36 couples the biscuits 34 to the track segments 30. The braze material 36 is located between the biscuit 34 and the first track segment 30 and between the biscuit 34 and the second track segment 30. In other embodiments, each joint 32 includes bonding material that couples together neighboring track segments 30 and the biscuits 34 are omitted as shown in FIGS. 8-14.

In some embodiments, the track segments 30 and joints 32 are joined together via a brazing process or co-processing. In some embodiments, the track segments 30 and biscuits 34 undergo CVI processing. In some embodiments, the track segments 30 and biscuits 34 are processed through slurry infiltration. In some embodiments, the track segments 30 and biscuits 34 are processed through melt infiltration. The biscuits 34 may provide improved strength over a matrix only/braze only joint. In some embodiments, the biscuits 34 and the track segments 34 may be integrally joined. In other embodiments, the track segments 30 and biscuits 34 are processed/densified as individual components and then assembled and brazed together.

In some embodiments, the inner radial faces 52 of the blade track 28 are machined relative to the full hoop. As such, greater manufacturing tolerances and tight flow path tolerances may be obtained. Machining blade track 28 may be performed before or after a coating process in which at least one face of blade track 28 is coated with a layer of coating material. In some embodiments, the coating layer is an abraidable coating. In some embodiments, end faces 38, 40 are machined.

In some embodiments, the blade track 28 includes cross-key features to mount the blade track 28 concentric with the central axis 20. The cross-key mounting may allow the blade track 28 to feely grow radially relative to a supporting case while maintaining concentricity with the central axis 20.

According to an aspect of the disclosure, a method of assembling a gas turbine engine assembly 10 may include a number of steps. The method includes inserting the biscuit 34 into the track segment 30A comprising ceramic-matrix composite materials along the end face 40 of the first track segment 30A and into the second track segment 30B comprising ceramic-matrix composite materials along the end face 38 of the second track segment 30B and brazing the biscuit 34 to the first track segment 30A and to the second track segment 30B to fix the second track segment 30B to the first track segment 30A.

Figure 5:
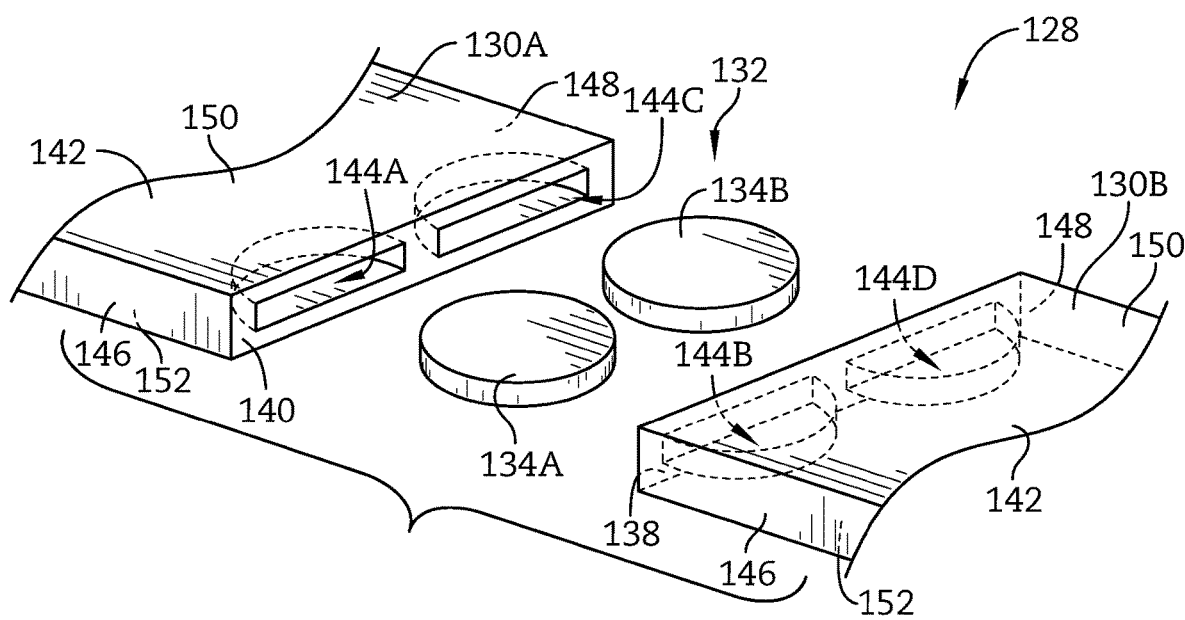
FIG. 5 is a partial exploded perspective view of an alternative blade track embodiment showing that the blade track includes a first biscuit and a second biscuit adapted to extend into adjacent track segments to fix the track segments in place.

Another illustrative blade track 128 is shown in FIG. 5. The blade track 128 is configured for use in the engine 10 and is substantially similar to the blade track 28 shown in FIGS. 1-4 and described herein. Accordingly, similar reference numbers in the 100 series indicate features that are common between the blade track 28 and the blade track 128. The description of the blade track 28 is hereby incorporated by reference to apply to the blade track 128, except in instances when it conflicts with the specific description and drawings of the blade track 128.

The blade track 128 includes track segments 130 and joints 132 as shown in FIG. 5. In the illustrative embodiment, the end faces 138, 140 of the track segments 130 are each formed to include two blind slots 144. Each joint 132 includes two biscuits 134.

Each track segment 130 is formed to include a first blind slot 44A, a second blind slot 44B, a third blind slot 144C, and a fourth blind slot 144D. The first and third blind slots 144A, 144C extend into the track segments 130 from the second circumferential end face 140 toward the first circumferential end face 138. The second and fourth blind slots 144B, 144D extend into the track segments 130 from the first circumferential end face 138 toward the second circumferential end face 140.

Each blind slot 144 is spaced apart radially from the outer radial face 150 and the inner radial face 152 of the track segment 130 to locate the blind slot 144 therebetween as shown in FIG. 5. Each blind slot 144 is spaced apart axially from the forward axial face 146 and the aft axial face 148 of the track segment 130 to locate the blind slot 144 therebetween. The first blind slot 144A is spaced apart axially from the third blind slot 144C. The second blind slot 144B is spaced apart axially from the fourth blind slot 144D. In other embodiments, the blind slots 144 may extend axially through one or both of the forward and aft axial faces 146, 148.

Illustratively, each joint 132 includes two biscuits 134A, 134B as shown in FIG. 5. Each biscuit 134 extends into the blind slots 144 of neighboring track segments 130 such as, for example, track segments 130A, 130B. The biscuit 134A, 134B fix the second track segment 130B in place relative to the first track segment 130A. The first biscuit 134A extends into the first blind slot 144A formed in the second circumferential end face 140 of the first track segment 130A and into the second blind slot 144B formed in the first circumferential end face 138 of the second track segment 130B. The second biscuit 134B extends into the third blind slot 144C formed in the second circumferential end face 140 of the first track segment 130A and into the fourth blind slot 144D formed in the first circumferential end face 138 of the second track segment 130B. As a result, the second biscuit 134B is spaced apart axially from the first biscuit 134A along the central axis 20.

In the illustrative embodiment, each blind slot 144 is shaped to match the contour of a corresponding biscuit 134. As shown in FIG. 5, the biscuit 34 has a round-disk shape. Illustratively, each blind slot 144 is shaped as one-half of a round-disk shape.

According to an aspect of the disclosure, a method of assembling a gas turbine engine assembly 10 may include a number of steps. The method includes inserting the first biscuit 134A into the first track segment 130A comprising ceramic-matrix composite materials along the end face 140 of the first track segment 130A and into the second track segment 130B comprising ceramic-matrix composite materials along the end face 138 of the second track segment 130B and brazing the first biscuit 134A to the first track segment 130A and to the second track segment 130B to fix the second track segment 130B to the first track segment 130A.

The method may further include inserting the second biscuit 134B, spaced from the first biscuit 134A, into the first track segment 130A along the end face 140 of the first track segment 130A and into the second track segment 130B along the end face 138 of the second track segment 130B. The method may further include brazing the second biscuit 134B to the first track segment 130A and to the second track segment 130B.

Figure 6:
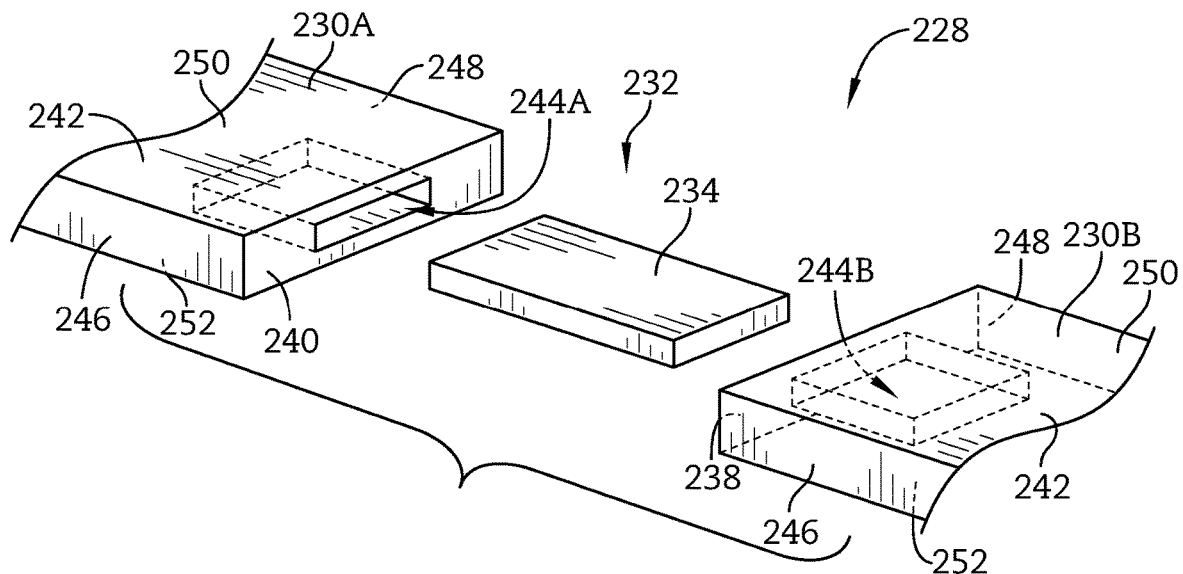
FIG. 6 is a partial exploded perspective view of an alternative blade track embodiment that includes a rectangular-disk shaped biscuit.

Another illustrative blade track 228 is shown in FIG. 6. The blade track 228 is configured for use in the engine 10 and is substantially similar to the blade track 28 shown in FIGS. 1-4 and described herein. Accordingly, similar reference numbers in the 200 series indicate features that are common between the blade track 28 and the blade track 228. The description of the blade track 28 is hereby incorporated by reference to apply to the blade track 228, except in instances when it conflicts with the specific description and drawings of the blade track 228.

As shown in FIG. 6, the biscuit 234 has a rectangular-disk shape. Each blind slot 244 is shaped to match the contour of a corresponding biscuit 234. Illustratively, each blind slot 244 is shaped as one-half of a rectangular-disk shape.

Figure 7:
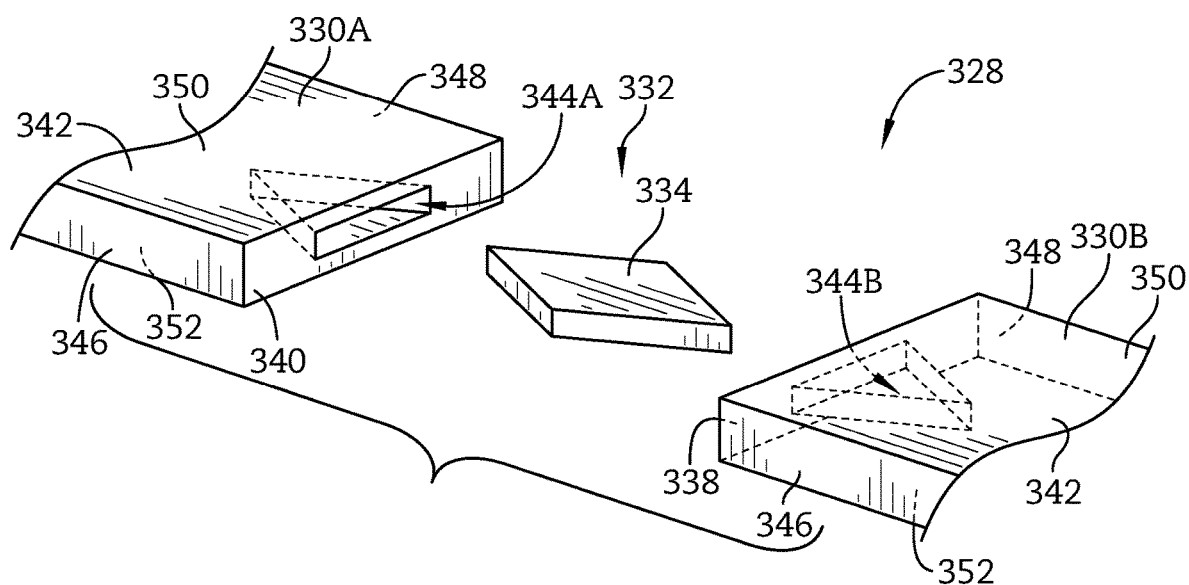
FIG. 7 is a partial exploded perspective view of an alternative blade track embodiment that includes a diamond-disk shaped biscuit.

Another illustrative blade track 328 is shown in FIG. 7. The blade track 328 is configured for use in the engine 10 and is substantially similar to the blade track 28 shown in FIGS. 1-4 and described herein. Accordingly, similar reference numbers in the 300 series indicate features that are common between the blade track 28 and the blade track 328. The description of the blade track 28 is hereby incorporated by reference to apply to the blade track 328, except in instances when it conflicts with the specific description and drawings of the blade track 328.

As shown in FIG. 7, the biscuit 334 has a diamond-disk shape. Each blind slot 344 is shaped to match the contour of a corresponding biscuit 334. Illustratively, each blind slot 344 is shaped as one-half of a diamond-disk shape.

Figure 8:
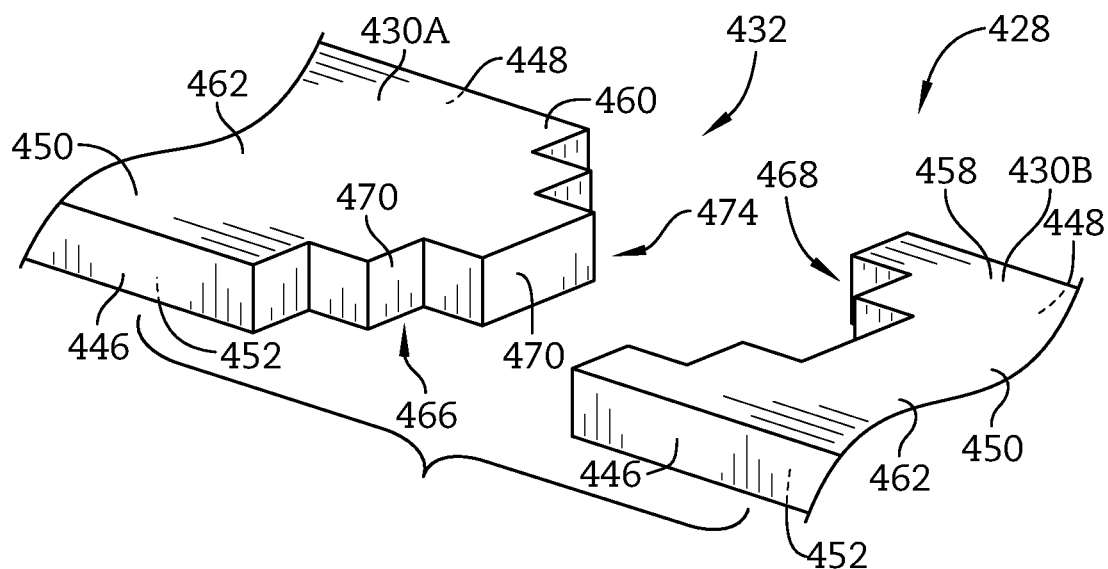
FIG. 8 is a partial exploded perspective view of an alternative blade track embodiment showing that each track segment is formed to include a circumferentially-extending tongue and a circumferentially-extending groove shaped to receive the circumferentially-extending tongue of a neighboring track segment to provide a joint that couples the track segments together.
Figure 9:
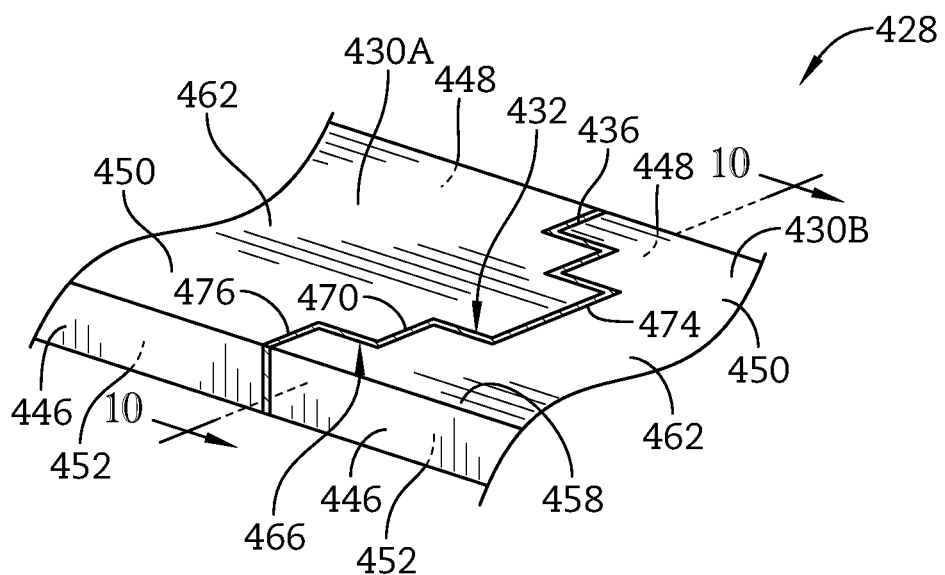
FIG. 9 is a partial perspective view of the blade track of FIG. 8 showing the circumferentially-extending tongue received in the circumferentially-extending groove and a layer of bonding material located in an interface formed circumferentially between a first track segment and a second track segment to fix the first track segment to the second track segment.
Figure 10:
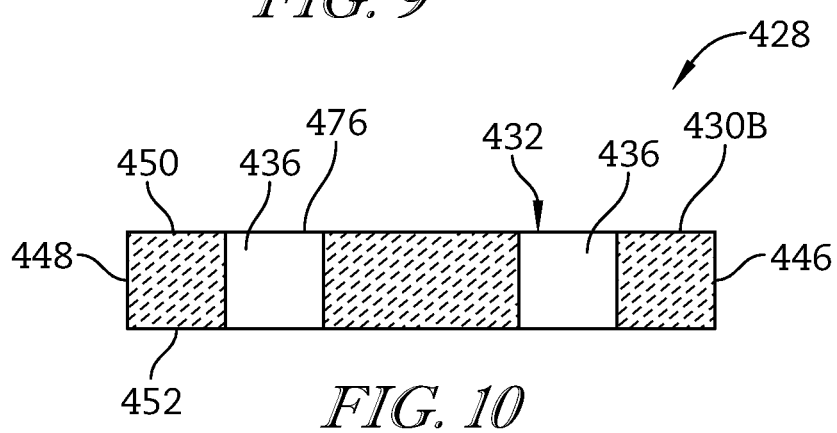
FIG. 10 is a cross-sectional view taken along line 10-10 of FIG. 9 showing that one-third or less of the interface between the first track segment and the second track segment is engaged by the layer of bonding material at any circumferential cross-sectional location.

Another illustrative blade track 428 is shown in FIGS. 8-10. The blade track 428 is configured for use in the engine 10 and is substantially similar to the blade track 28 shown in FIGS. 1-4 and described herein. Accordingly, similar reference numbers in the 400 series indicate features that are common between the blade track 28 and the blade track 428. The description of the blade track 28 is hereby incorporated by reference to apply to the blade track 428, except in instances when it conflicts with the specific description and drawings of the blade track 428.

The blade track 428 includes track segments 430 located circumferentially adjacent to one another to form a full hoop around the central axis 20 and joints 432 that couples the track segments 430 together to fix the track segments 430 in place relative to one another. Referring to FIG. 8, each track segment 430 has a first circumferential end portion 458, a second circumferential end portion 460, and a central section 462 interconnecting the first circumferential end portion 458 and the second circumferential end portion 460. Each first circumferential end portion 458 is arranged to face the second circumferential end face 460 of the neighboring track segment 430. The joints 432 couple the track segments 430 together to fix each first circumferential end portion 458 in place relative to the second circumferential end face 460 of the neighboring track segment 430.

Illustratively, each joint 432 includes a circumferentially-extending tongue 466, a corresponding circumferentially-extending groove 468, and a layer of bonding material 436 as shown in FIGS. 8-10. The circumferentially-extending tongue 466 is formed by the second circumferential end portion 460 of the first track segment 430A. The circumferentially-extending groove 468 is formed by the first circumferential end portion 458 of the second track segment 430B and is shaped to receive the circumferentially-extending tongue 466. The layer of bonding material 436 is arranged at an interface 476 formed circumferentially between the first track segment 430A and the second track segment 430B to fix the first track segment 430A to the second track segment 430B. In some embodiments, the bonding material 436 comprises braze material.

In illustrative embodiments, the circumferentially-extending tongue 466 and the circumferentially-extending groove 468 are shaped so that less than half of the interface 476 between the first track segment 430A and the second track segment 430B is available to be engaged by the layer of bonding material 436 at any circumferential cross-sectional location. In some embodiments, the circumferentially-extending tongue 466 and the circumferentially-extending groove 468 are shaped so that one-third or less of the interface 476 between the first track segment 430A and the second track segment 430B is available to be engaged by the layer of bonding material 436 at any circumferential cross-sectional location as shown, for example, in FIG. 10.

As shown in FIG. 8, the track segments 430 further include the forward axial face 446, the aft axial face 448, the outer radial face 450, and the inner radial face 452. The forward axial face 446 faces the forward end of the blade track 428. The aft axial face 448 is spaced apart axially from the forward axial face 446 and faces the aft end of the blade track 428. The outer radial face 450 faces radially outward away from the central axis 20 and interconnects the forward and aft axial faces 446, 448. The inner radial face 452 is spaced apart radially from the outer radial face 50 to locate the inner radial face 452 radially between the central axis 20 and the outer radial face 450. The inner radial face 452 interconnects the forward and aft axial faces 446, 448.

The circumferentially-extending tongue 466 includes a circumferential end 474 as shown in FIG. 8. The circumferential end 474 is arranged to be located about midway between the forward axial face 446 of the first track segment 430A and the aft face 448 of the track segment 430 as shown in FIGS. 8 and 9. As shown in FIGS. 8-10, the circumferentially-extending tongue 466 is shaped to form steps 470 when viewed inwardly in a radial direction toward the central axis 20.

A method of making a gas turbine engine assembly in accordance with the present disclosure may include a number of steps. The method may include inserting the circumferentially-extending tongue 466 formed by the end portion 460 of the first track segment 430A into the circumferentially-extending groove 468 formed by the end portion 458 of the second track segment 430B and brazing the first track segment 430A to the second track segment 430B along the interface 476 circumferentially between the first track segment 430A and the second track segment 430B to form the joint 432. The interface 476 including the circumferentially-extending tongue 466 and the circumferentially-extending groove 468. The first track segment 430A and the second track segment 430B comprise ceramic-matrix composite materials. The circumferentially-extending tongue 466 and the circumferentially-extending groove 468 are shaped so that one-third or less of the interface 476 between the first track segment 430A and the second track segment 430B is available to be engaged by the braze 436 at any circumferential cross-sectional location of the joint 432.

Figure 11:
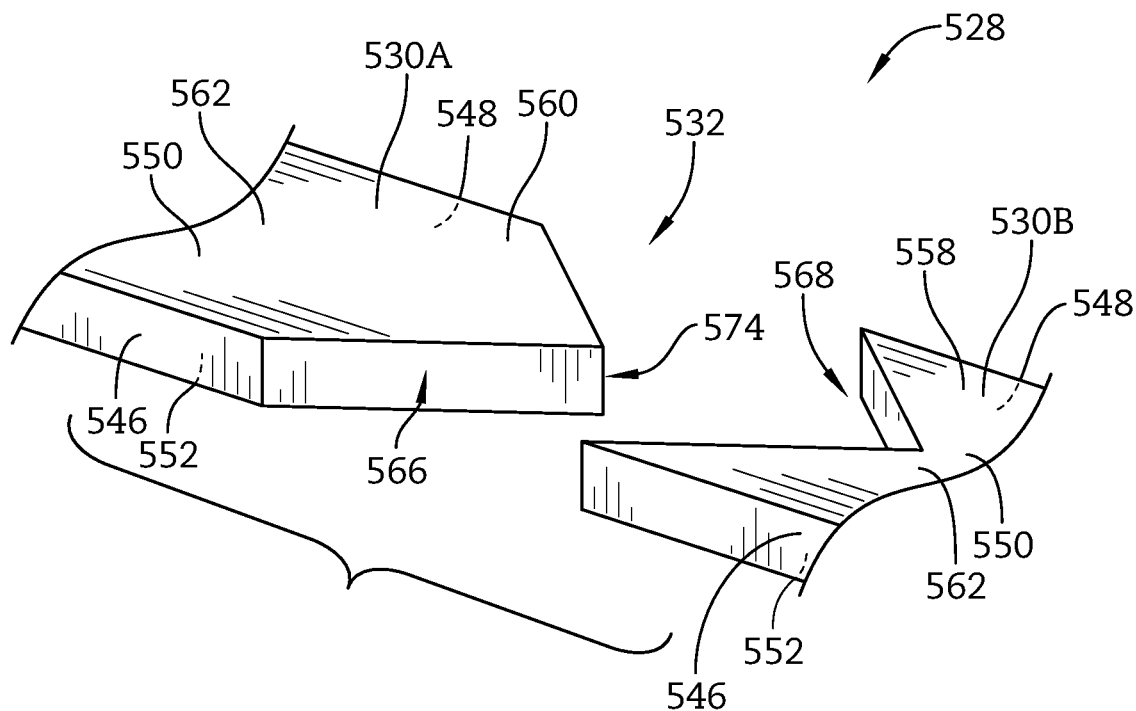
FIG. 11 is a partial exploded perspective view of an alternative blade track embodiment that includes track segments having a circumferentially-extending tongue with a triangular shape.

Another illustrative blade track 528 is shown in FIG. 11. The blade track 528 is configured for use in the engine 10 and is substantially similar to the blade track 428 shown in FIGS. 8-10 and described herein. Accordingly, similar reference numbers in the 500 series indicate features that are common between the blade track 428 and the blade track 528. The description of the blade track 428 is hereby incorporated by reference to apply to the blade track 528, except in instances when it conflicts with the specific description and drawings of the blade track 528. The circumferentially-extending tongue 566 is shaped to form a generally triangular shape when viewed inwardly in a radial direction toward the central axis 20.

Figure 12:
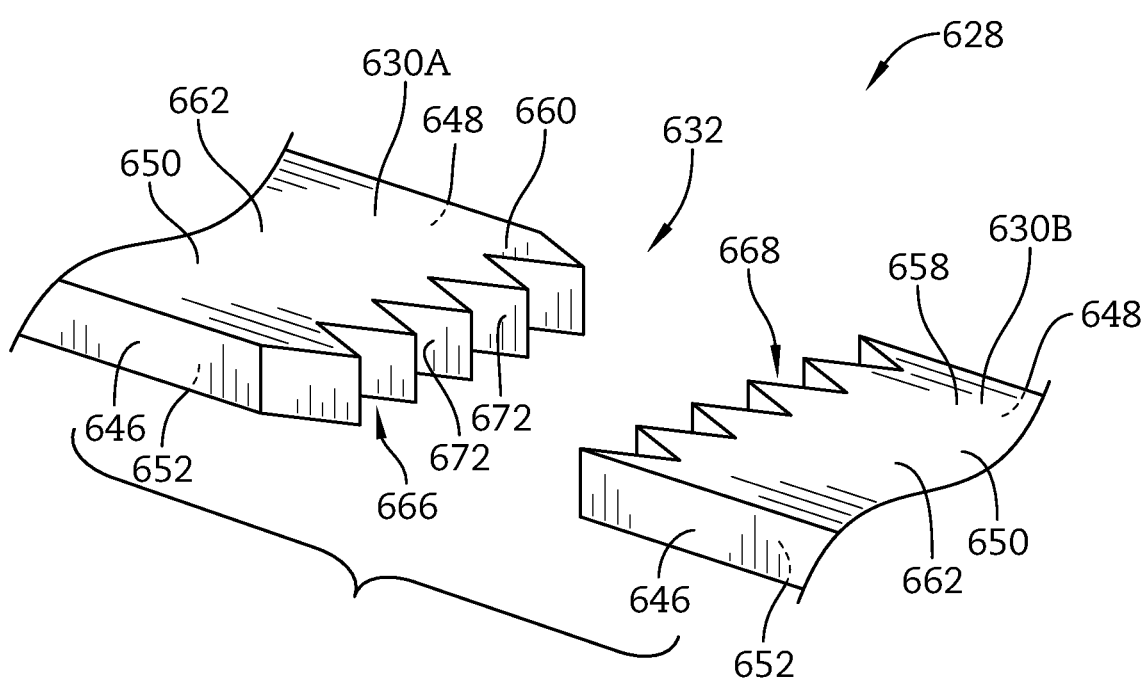
FIG. 12 is a partial exploded perspective view of an alternative blade track embodiment that includes track segments having a circumferentially-extending tongue shaped to form a plurality of teeth.

Another illustrative blade track 628 is shown in FIG. 12. The blade track 628 is configured for use in the engine 10 and is substantially similar to the blade track 428 shown in FIGS. 8-10 and described herein. Accordingly, similar reference numbers in the 600 series indicate features that are common between the blade track 428 and the blade track 628. The description of the blade track 428 is hereby incorporated by reference to apply to the blade track 628, except in instances when it conflicts with the specific description and drawings of the blade track 628.

The circumferentially-extending tongue 666 is shaped to form a plurality of teeth 672 when viewed inwardly in a radial direction toward the central axis 20. In the illustrative embodiment, the teeth 672 are triangular shape.

Figure 13:
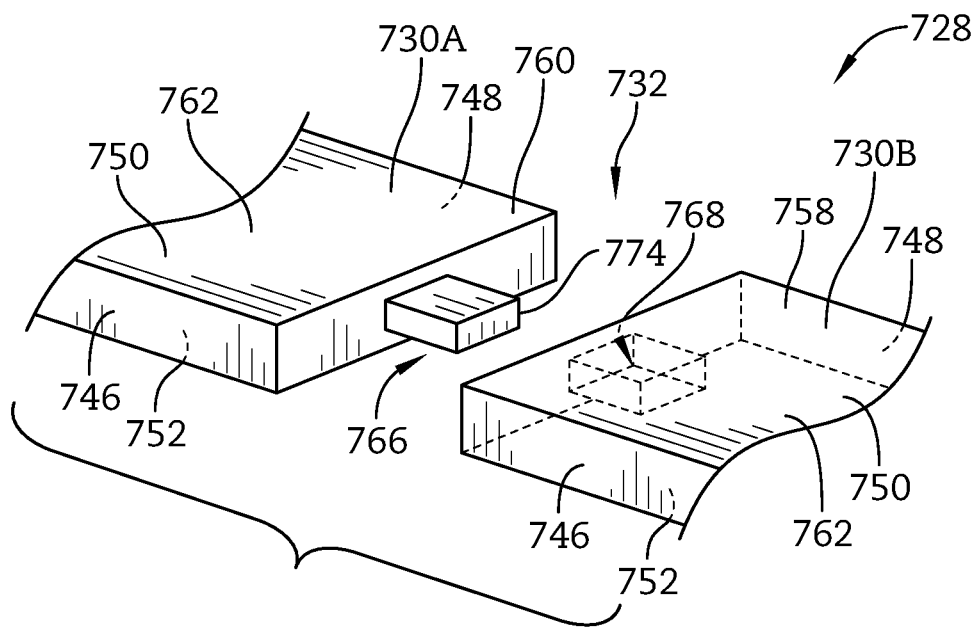
FIG. 13 is a partial exploded perspective view of an alternative blade track embodiment that includes track segments having a circumferentially-extending tongue that is spaced apart from axial and radial faces of the track segment.
Figure 14:
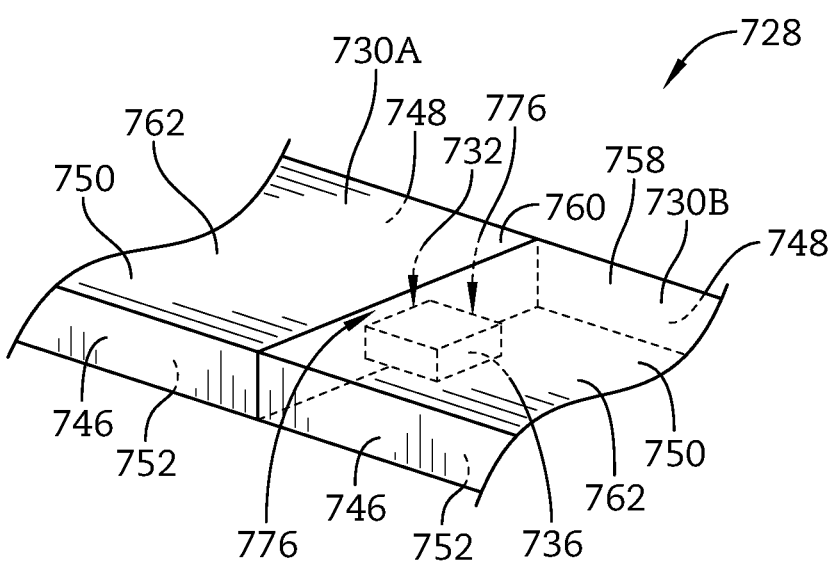
FIG. 14 is a partial perspective view of the blade track of FIG. 13 showing the circumferentially-extending tongue received in the circumferentially-extending groove to fix a first track segment to a second track segment.

Another illustrative blade track 728 is shown in FIGS. 13 and 14. The blade track 728 is configured for use in the engine 10 and is substantially similar to the blade track 428 shown in FIGS. 8-10 and described herein. Accordingly, similar reference numbers in the 700 series indicate features that are common between the blade track 428 and the blade track 728. The description of the blade track 428 is hereby incorporated by reference to apply to the blade track 728, except in instances when it conflicts with the specific description and drawings of the blade track 728.

As shown in FIGS. 13 and 14, the track segments 730 further include the forward axial face 746, the aft axial face 748, the outer radial face 750, and the inner radial face 752. The forward axial face 746 faces the forward end of the blade track 728. The aft axial face 748 is spaced apart axially from the forward axial face 746 and faces the aft end of the blade track 728. The outer radial face 750 faces radially outward away from the central axis 20 and interconnects the forward and aft axial faces 746, 748. The inner radial face 752 is spaced apart radially from the outer radial face 750 to locate the inner radial face 752 radially between the central axis 20 and the outer radial face 750. The inner radial face 752 interconnects the forward and aft axial faces 746, 748.

The circumferentially-extending tongue 766 is spaced apart radially from the outer radial face 750 and the inner radial face 752 of the track segment 730 as shown in FIG. 13. The circumferentially-extending tongue 766 is spaced apart axially from the forward axial face 746 and the aft axial face 748 of the track segment 730.

The circumferentially-extending groove 768 is spaced apart radially from the outer radial face 750 and the inner radial face 752 of the track segment 730 to locate the circumferentially-extending groove 768 therebetween as shown in FIG. 13. Each circumferentially-extending groove 768 is spaced apart axially from the forward axial face 746 and the aft axial face 748 of the track segment 730 to locate the circumferentially-extending groove 768 therebetween. In other embodiments, the circumferentially-extending grooves 768 extend axially through one or both of the forward and aft axial faces 746, 748. In the illustrative embodiment, each circumferentially-extending groove 768 is shaped to match the contour of the corresponding circumferentially-extending tongue 766 as shown in FIG. 14.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A full-hoop blade track for a gas turbine engine, the blade track comprising
 a first segment comprising ceramic-matrix composite materials and shaped to extend part-way around a central axis, the first segment having a first circumferential end portion and a second circumferential end portion, and
 a second segment comprising ceramic-matrix composite materials and shaped to extend part-way around the central axis, the second segment having a first circumferential end portion and a second circumferential end portion, and
 a joint including a circumferentially-extending tongue formed by the second circumferential end portion of the first segment, a circumferentially-extending groove formed by the first circumferential end portion of the second segment and shaped to receive the circumferentially-extending tongue, and a layer of bonding material arranged at an interface formed circumferentially between the first segment and the second segment to fix the first segment to the second segment,
 wherein the circumferentially-extending tongue and the circumferentially-extending groove are configured so that one-third or less of the interface between the first segment and the second segment is engaged by the layer of bonding material at any circumferential cross-sectional location,
 wherein the circumferentially-extending tongue is configured to form a generally triangular shape when viewed inwardly in a radial direction toward the central axis.

2. The full-hoop blade track of claim 1, wherein a circumferential end of the circumferentially-extending tongue is located about midway between a forward axial face of the first segment and an aft axial face of the first segment.

3. The full-hoop blade track of claim 1, wherein the circumferentially-extending tongue is configured to form a plurality of teeth when viewed inwardly in a radial direction toward the central axis.

4. The full-hoop blade track of claim 1, wherein the circumferentially-extending tongue is spaced apart from a forward axial face of the first segment and from an aft axial face of the first segment and the circumferentially-extending tongue is spaced apart from an outer radial face of the first segment and from an inner radial face of the first segment.

5. The full-hoop blade track of claim 1, wherein the layer of bonding material include a braze material.

6. The full-hoop blade track of claim 1, wherein the first segment includes an outer radial surface that faces outwardly away from the central axis and extends partway around the central axis, the first outer radial surface is continuous with a substantially consistent circumference.

7. The full-hoop blade track of claim 1, wherein the first segment includes a forward axial face and an aft axial face spaced axially apart from the forward axial face, and the forward axial face and the aft axial face are substantially continuous and planar.

8. A full-hoop blade track for a gas turbine engine assembly, the blade track comprising
 a first segment comprising ceramic-matrix composite materials and shaped to extend part-way around a central axis, the first segment having a first circumferential end portion and a second circumferential end portion, and
 a second segment comprising ceramic-matrix composite materials and shaped to extend part-way around the central axis, the second segment having a first circumferential end portion and a second circumferential end portion, and
 a joint including a tongue formed by the second circumferential end portion of the first segment, a groove shaped to receive the circumferentially-extending tongue formed by the first circumferential end portion of the second segment, and a layer of bonding material arranged at an interface formed circumferentially between the first segment and the second segment, wherein the tongue and the groove are configured so that one-third or less of the interface between the first segment and the second segment is engaged by the layer of bonding material at any circumferential cross-sectional location, wherein the tongue is spaced apart from a forward axial face of the first segment and from an aft axial face of the first segment and the tongue is spaced apart from an outer radial face of the first segment and from an inner radial face of the first segment.

9. The full-hoop blade track of claim 8, wherein a circumferential end of the tongue is located about midway between the forward axial face of the first segment and the aft axial face of the first segment.

10. The full-hoop blade track of claim 8, wherein the groove is spaced apart from a forward axial face of the second segment and from an aft axial face of the second segment and the groove is spaced apart from an outer radial face of the second segment and from an inner radial face of the second segment.

11. The full-hoop blade track of claim 10, wherein the groove is located about midway between the outer radial face of the second segment and the inner radial face of the second segment.

12. The full-hoop blade track of claim 10, wherein the groove is located about midway between the forward axial face of the second segment and the aft axial face of the second segment.

13. The full-hoop blade track of claim 8, wherein the layer of bonding material include a braze material.

14. The full-hoop blade track of claim 8, wherein a circumferential end of the tongue is located about midway between the outer radial face of the first segment and the inner radial face of the first segment.

15. The full-hoop blade track of claim 8, wherein the outer radial face is continuous with a substantially consistent circumference.

16. The full-hoop blade track of claim 8, wherein the forward axial face and the aft axial face are substantially continuous and planar.

17. A method of making a full-hoop blade track for a gas turbine engine assembly, the method comprising inserting a circumferentially-extending tongue formed by an end portion of a first segment into a circumferentially-extending groove formed by an end portion of a second segment, and brazing the first segment to the second segment with braze along an interface circumferentially between the first segment and the second segment to form a joint, the interface including the circumferentially extending tongue and the circumferentially-extending groove, wherein the first segment and the second segment comprise ceramic-matrix composite materials and the circumferentially-extending tongue and the circumferentially-extending groove are configured so that one-third or less of the interface between the first segment and the second segment is engaged by the braze at any circumferential cross-sectional location of the joint, wherein the circumferentially-extending tongue is configured to form steps when viewed inwardly in a radial direction toward a central axis.

* * * * *